(12) United States Patent
Morimoto et al.

(10) Patent No.: US 9,013,159 B2
(45) Date of Patent: Apr. 21, 2015

(54) PARALLEL-OPERATING POWER SUPPLY SYSTEM

(71) Applicant: Sansha Electric Manufacturing Company, Limited, Osaka-shi, Osaka-fu (JP)

(72) Inventors: Hiroki Morimoto, Osaka (JP); Tatsuya Kawabata, Osaka (JP)

(73) Assignee: Sansha Electric Manufacturing Company, Limited, Osaka-Fu (JP)

( * ) Notice: Subject to any disclaimer, the term of this patent is extended or adjusted under 35 U.S.C. 154(b) by 0 days.

(21) Appl. No.: 14/017,752

(22) Filed: Sep. 4, 2013

(65) Prior Publication Data

US 2014/0160814 A1    Jun. 12, 2014

(30) Foreign Application Priority Data

Dec. 10, 2012 (JP) ................. 2012-269175

(51) Int. Cl.
*H02M 3/158* (2006.01)
*H02M 7/23* (2006.01)

(52) U.S. Cl.
CPC ............. *H02M 3/1584* (2013.01); *H02M 7/23* (2013.01)

(58) Field of Classification Search
USPC ............ 363/65, 67, 69, 84, 89; 323/222–225, 323/271–275, 282–285
See application file for complete search history.

(56) References Cited

U.S. PATENT DOCUMENTS

| | | | |
|---|---|---|---|
| 5,757,627 A * | 5/1998 | Faulk ........................ | 363/21.14 |
| 6,031,361 A * | 2/2000 | Burstein et al. ............. | 323/224 |
| 6,346,798 B1 * | 2/2002 | Passoni et al. .............. | 323/272 |
| 2005/0225178 A1 * | 10/2005 | Shao et al. .................... | 307/129 |
| 2009/0021278 A1 * | 1/2009 | Khaira .......................... | 324/765 |

FOREIGN PATENT DOCUMENTS

| | | |
|---|---|---|
| JP | 2010-158125 A | 7/2010 |
| JP | 2012-151937 A | 9/2013 |

OTHER PUBLICATIONS

Texas Instruments Incorporated, LM3753 Scalable 2-Phase Synchronous Buck Controller with Integrated FET Drivers and Linear Regulator Controller, Dec. 2009.*
Office Action issued on Jan. 29, 2015 in corresponding Korean Patent Application No. 1020130114748.

* cited by examiner

*Primary Examiner* — Timothy J Dole
*Assistant Examiner* — Ishrat Jamali
(74) *Attorney, Agent, or Firm* — Duane Morris LLP; Joseph A. Powers

(57) ABSTRACT

Each of master and slave switching power supply apparatuses (2*m*, 2*s*) has an IGBT (10*m* or 10*s*) switching-controlled by a PWM pulse signal produced, based on a clock signal, by a switching device driving PWM pulse output section (28*m* or 28*s*), to thereby provide DC power in parallel to a load (5). The clock signal produced in the master switching power supply apparatus (2*m*) is coupled to the slave switching power supply apparatus (2*s*) through a photocoupler (36*m*) in the master switching power supply apparatus (2*m*) and a photocoupler (38*s*) of the slave switching power supply apparatus (2*s*). Also, the clock signal developed at the output of the photocoupler (36*m*) is coupled through a photocoupler (38*m*) to the master switching power supply apparatus (2*m*). The photocouplers (36*m*, 38*m*, 38*s*) have the same delay characteristic.

8 Claims, 3 Drawing Sheets

PARALLEL-OPERATING POWER SUPPLY SYSTEM

TECHNICAL FIELD

This invention relates to a power supply system and, more particularly, to a system in which a plurality of power supply apparatuses are operated in parallel.

BACKGROUND ART

Conventional parallel-operating power supply systems have a problem of how to suppress cross current flowing between power supply apparatuses. According to a technology disclosed in JP2010-158125A1, for example, cross current control is achieved in the following manner. A common-mode choke coil is disposed between first and second switching power supplies and a load in such a manner that the cross current flowing from the first switching power supply to the second switching power supply and the current flowing from the load to the first switching power supply can flow, as a common current, into the common-mode choke coil. Further, a second common-mode choke coil is disposed between the first and second switching power supplies and the load in such a manner that the cross current flowing from the second switching power supply to the first switching power supply and the current flowing from the load to the second switching power supply can flow, as a common current, into the second common-mode choke coil.

Recent switching power supplies are frequently digitally controlled. A control unit ON-OFF controlling a switching device of a switching power supply provides a switching signal for achieving the ON-OFF control based on a reference clock signal. When such switching power supplies are operated in parallel, and if each switching power supply is arranged to provide its own reference clock signal for itself, the respective reference clock signals may become out of phase with each, causing the timing of turning on and off the switching devices of the respective switching power supplies to be deviated from each other, which, in turn, may result in cross current. In order to suppress ripple components in the current to be supplied to the load, the timing of switching the switching device of each of the switching power supplies must be controlled with precise difference provided with respect to each other, but such control is difficult if the phases of the reference clock signals of the respective switching power supplies are different.

An object of the invention is to provide a parallel-operating power supply system in which occurrence of cross currents can be suppressed and also ripple components in the output thereof can be reduced.

SUMMARY OF INVENTION

A parallel-operating power supply system according to one embodiment of the present invention includes plural, i.e. two or more, switching power supply apparatuses. Each switching power supply apparatus includes a switching device which is switching-controlled by a switching signal prepared on a clock signal, and develops an output between two output terminals. The output can be an AC output or can be a DC output. A PWM signal, for example, may be used as the switching signal. The two output terminals of each of the plural switching power supply apparatuses are connected in parallel with the two output terminals of respective ones of the other switching power supply apparatuses. An IGBT, a bipolar transistor or an MOSFET, for example, can be used as the switching device. One or plural such switching devices can be used in each of the switching power supply apparatuses. The clock signal provided by one of the plurality of switching power supply apparatuses, e.g. a master switching power supply apparatus, is supplied to the other switching power supply apparatuses, e.g. slave switching power supply apparatuses, as the clock signal therefore. The supply of this clock signal is done through a transmission circuit the master switching power supply apparatus has and transmission circuits the respective slave switching power supply apparatuses have. For example, the transmission circuit of the master switching power supply apparatus may be an output transmission circuit, with the transmission circuits of the slave switching power supply apparatuses may be input transmission circuits. The input and output transmission circuits have the same delay characteristic. The clock signal outputted through the output transmission circuit, which the master switching power supply apparatus has, is supplied back to the master switching power supply circuit through another, separate transmission circuit, e.g. a master input transmission circuit, having the same delay characteristics as the respective other transmission circuits, in order to develop the aforementioned switching signal. A transmission circuit desirable for use as each of the transmission circuits is a circuit having its input and output insulated from each other. A photocoupler, for example, may be used as the transmission circuits.

In the parallel-operating power supply system with the above-described arrangement, the clock signal from the master switching power supply apparatus is delayed by the output transmission circuit therein, and is further delayed by the input transmission circuit of each slave switching power supply apparatus before it is supplied to each slave switching power supply apparatus. In other words, the clock signal taken into each slave switching power supply apparatus has been delayed twice by the two transmission circuits. The clock signal taken into the master switching power supply apparatus is the clock signal supplied to the output transmission circuit, which the master switching power supply apparatus has, via a master input transmission circuit of the master switching power supply apparatus. Thus, this clock signal, too, has been delayed twice. As stated above, all of the transmission circuits have the same delay characteristic, and, therefore, the clock signals taken into the master and slave switching power supply apparatuses have similarly delayed. This means that the clock signals are in phase with each other. Thus, the use of these in-phase clock signals makes it possible to make the master and slave switching power supply apparatuses produce the switching signals which are in phase with each other, resulting in suppression of generation of cross current and, also, generation of output ripples.

The master and slave switching power supply apparatuses may each include a clock synchronization control unit for synchronizing the clock signal with a reference signal. In such arrangement, the clock signal supplied to each slave switching power supply apparatus via the input transmission circuit, which that slave switching power supply apparatus has, is supplied to the clock synchronization control unit. The master switching power supply apparatus includes a reference clock signal source. In the master switching power supply apparatus, a clock signal from the reference clock signal source is supplied to the transmission circuit, and the clock signal developed at the output of the transmission circuit is supplied through the separate transmission circuit to the clock synchronization control unit.

Each of the switching power supply apparatuses may include a reactor and a smoothing capacitor in its output side. The reactor may be connected in series between one of the output sides of a switching power supply and one of the two output terminals, with the smoothing capacitor connected in parallel between the two output terminals. A parallel-operating power supply system including such smoothing capacitors, the capacitors may sometimes be sources of cross currents, and, therefore, the suppression of generation of such cross currents achieved in the parallel-operating power supply system of the present invention has great significance.

Each of the switching power supply apparatuses may include a voltage-boosting section, a voltage-step-down section, or a voltage boosting and step-down section, which includes the above-described switching device. With such arrangement, the parallel-operating power supply system can adapt itself to the voltage required by the load connected between the two output terminals.

DESCRIPTION OF EMBODIMENTS

Figure 1:
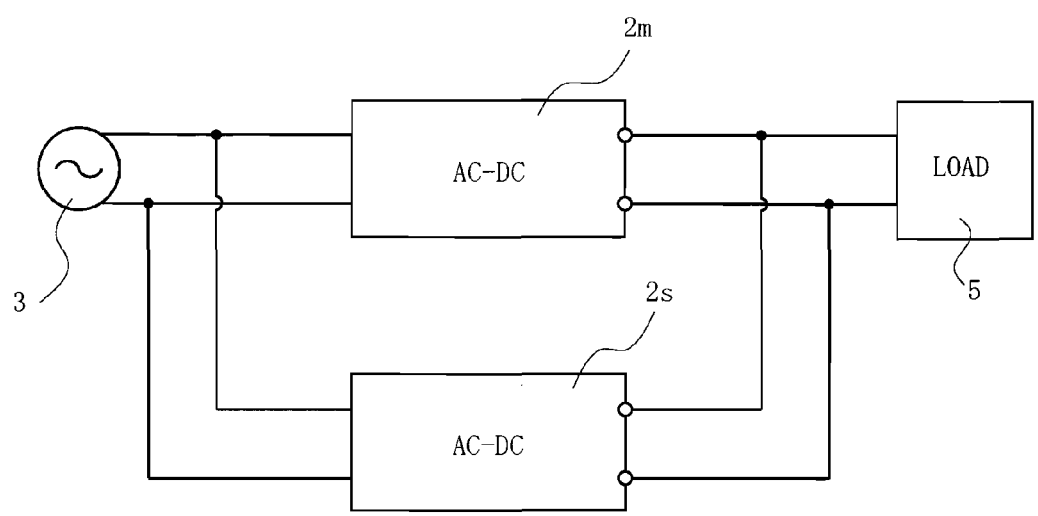
FIG. 1 is a block diagram of a parallel-operating power supply system according to an embodiment of the present invention.

A parallel-operating power supply system according to one embodiment of the present invention includes plural, two, for example, switching power supply apparatuses $2m$ and $2s$, as shown in FIG. 1. Each of the two switching power supply apparatuses $2m$ and $2s$ may be, for example, an AC-to-DC converter (AC-DC) which operates to convert AC power supplied thereto from a commercial AC power supply 3 into DC power. The DC output power from the two switching power supply apparatuses $2m$ and $2s$ is supplied in parallel to a load 5, e.g. a lamp. The two switching power supply apparatuses $2m$ and $2s$ have the same structure, and, therefore, only the switching power supply apparatus $2m$ is described in detail hereinafter. Reference numerals with a letter "m" attached are used for components of the switching power supply apparatus $2m$, and the same reference numerals as used for the components of the switching power supply apparatus $2m$ are used, together with a letter "s" attached to the respective reference numerals, for the corresponding components of switching power supply apparatus $2s$.

Figure 2:
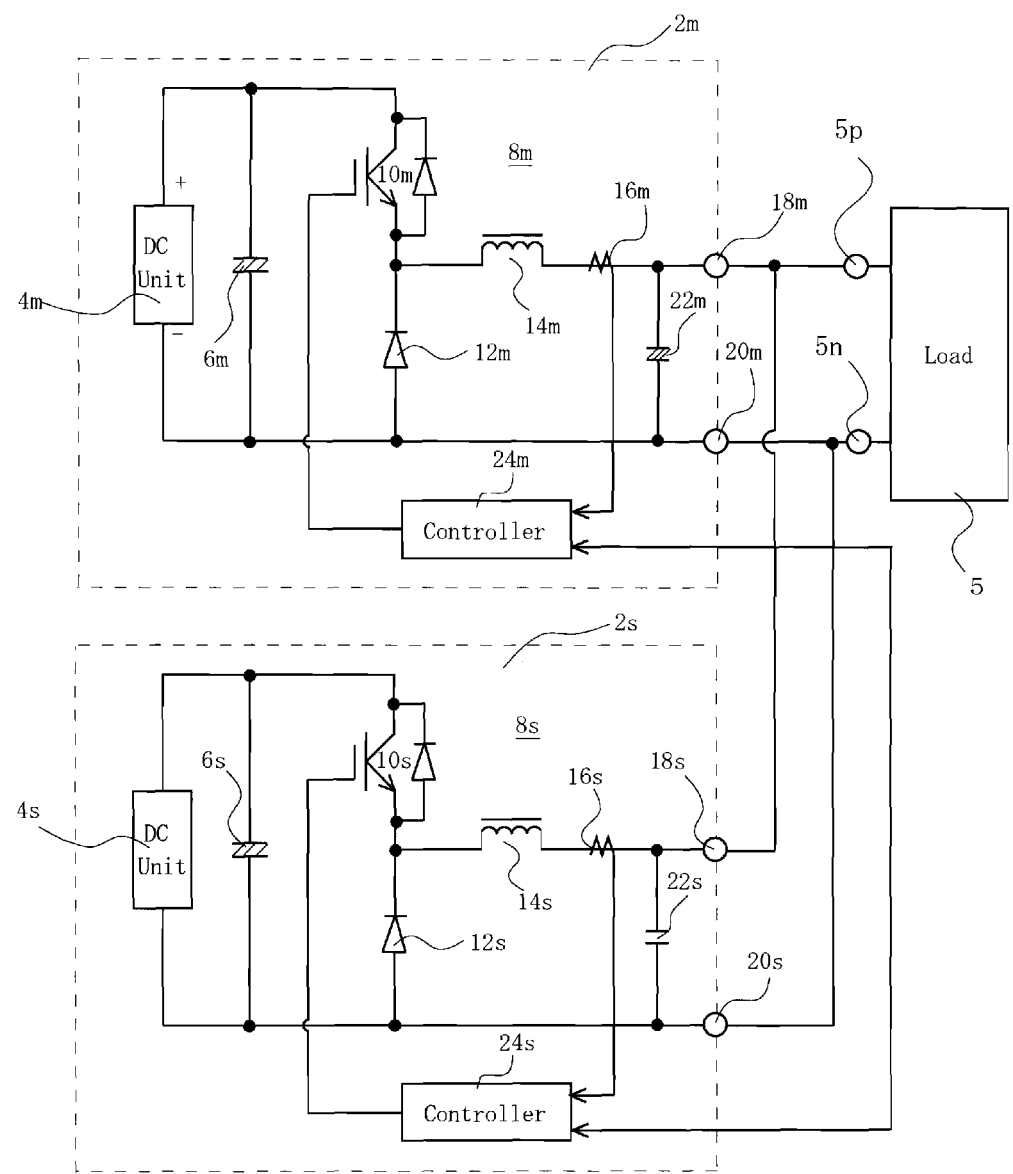
FIG. 2 is a detailed block diagram of the parallel-operating power supply system of FIG. 1.

As shown in FIG. 2, the switching power supply apparatus $2m$ has a DC unit $4m$. The DC unit $4m$ converts AC power supplied from the commercial AC power supply 3 to DC power, and includes a power factor improving circuit, a transformer and a rectifying section, for example. The DC output of the DC unit $4m$ is smoothed by a smoothing capacitor $6m$ connected between two output terminals of the DC unit $4m$ and applied to a step-down section $8m$.

The step-down section $8m$ has a switching device or, in more particular, IGBT $10m$, having its collector connected to one of the outputs of the DC unit $4m$, e.g. a positive (+) side, and having its emitter connected to the cathode of a diode $12m$. The anode of the diode $12m$ is connected to the other output of the DC unit $4m$, e.g. the negative (−) side. The junction of the IGBT $10m$ and the diode $12m$ is connected to one of the output terminals, e.g. the output terminal $18m$, through a series combination of a reactor $14m$ and a current detector $16m$, for example. The other output terminal $20m$ is connected to the anode of the diode $12m$. A smoothing capacitor $22m$ is connected between the output terminals $18m$ and $20m$. The current detector $16m$ may be one that uses a Hall current converter or a shunt resistor.

The IGBT $10m$ is supplied with a switching signal, e.g. a PWM pulse signal, from control means, e.g. a controller $24m$. The PWM pulse signal is generated in the controller $24m$, being based on a current-representative signal from the current detector $16m$, which represents the current as detected by the current detector $16m$. The IGBT $10m$ is ON-OFF controlled with this PWM pulse signal. The ON-OFF controlled IGBT $10m$ and the reactor $14m$ cooperate with each other to step down the output voltage of the DC unit 4, and the resulting, lowered output voltage is applied between the output terminals $18m$ and $20m$.

The same-polarity output terminals $18m$ and $18s$ of the switching power supply apparatuses $2m$ and $2s$ are connected together, and the same-polarity output terminals $20m$ and $20s$ of the switching power supply apparatuses $2m$ and $2s$ are connected together. In other words, the output terminals $18m$ and $20m$ and the output terminals $18s$ and $20s$ are connected in parallel. The interconnected output terminals $18m$ and $18s$ are connected to one terminal, e.g. a positive terminal $5p$, of one load 5, e.g. the lamp 5, and the interconnected output terminals $20m$ and $20s$ are connected to the other terminal, e.g. a negative terminal $5n$, of the load 5, whereby DC power is supplied to the load 5.

Figure 3:
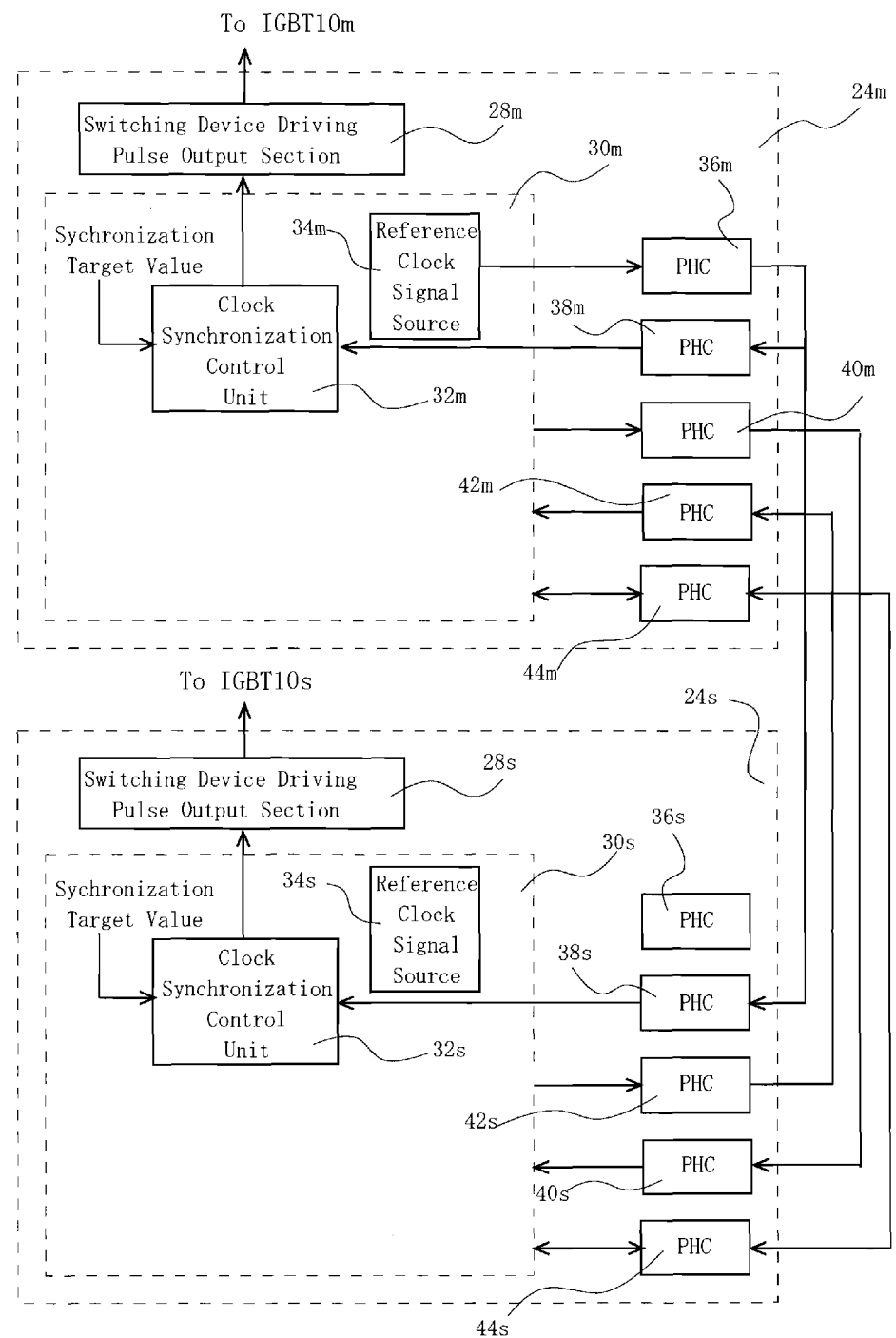
FIG. 3 is a block diagram of control units of the parallel-operating power supply system of FIG. 1

As shown in FIG. 3, the controller $24m$ has a switching device driving pulse output section $28m$ which outputs a PWM pulse signal for the IGBT $10m$. The controller $24m$ has a digital signal processing unit $30m$, too. The digital signal processing unit $30m$ has a clock synchronization control unit $32m$. The switching device driving PWM pulse output section $28m$ produces a PWM pulse signal based on the output of the clock synchronization control unit $32m$. The output of the clock synchronization control unit $32m$ controls the switching period of the PWM pulse signal. The clock synchronization control unit $32m$ receives a reference clock signal and a synchronization target value, and makes the phase of the reference clock signal coincide with the synchronization target value. Then, the clock synchronization control unit $32m$ supplies the output thereof, which is the reference clock signal having its phase coincident with the target value, to the switching device driving pulse output section $28m$. According to a conventional technology, a reference clock signal is generated in a reference clock signal source $34m$ contained in the digital signal processing unit $30m$ and is supplied directly to the clock synchronization control unit $32m$.

In the switching power supply apparatus $2m$, if the reference clock signal from the reference clock signal source $34m$ were applied to the clock synchronization control unit $32m$ and the reference clock signal from the reference clock signal source $34s$ of the switching power supply apparatus $2s$ were applied to the clock synchronization control unit $32s$, there would be a possibility that the reference clock signals from the reference clock signal source $34m$ and the reference clock signal source $34s$ could be out of phase with each other. In such case, when the switching device driving PWM output sections $28m$ and $28s$ produce the respective PWM pulse signals based on the outputs from the clock synchronization control units $32m$ and $32s$ operating, being referenced to the reference clock signals which are out of phase with each other, the timing of turning on of the IGBT $10m$ and the timing of turning on of the IGBT $10s$ would be displaced relative to each other, and/or the timing of off of the IGBT $10m$ and the timing of turning off of the IGBT $10s$ would be displaced relative to each other, which would cause cross current flowing between the switching power supply apparatuses $2m$ and $2s$. For example, if there is difference in switching timing when the current control of IGBT's 10m and 10s is done with reference to the currents detected by the current detectors 14m and 14s, cross current tends to flow due to resonance caused by the smoothing capacitors 22m and 22s and the wiring inductance component. In order to prevent it, it is necessary to make the phases of the reference clock signals to be applied to the clock synchronization control units 32m and 32s coincide with each other. Also, if it is necessary to reduce ripple components contained the load current flowing through the load 5, the timing of turning on and/off of the IGBT's 10m and 10s, for example, should be shifted by a predetermined amount. The reference clock signals to be applied to the clock synchronization control units 32m and 32s must also be made in phase with each other in order to precisely shift the timing of turning on and/off of the IGBT's 10m and 10s by a predetermined amount.

One idea of making the reference clock signals for the two switching power supply apparatuses 2m and 2s be in phase with each other may be, for example, applying the reference clock signal from the reference clock signal source 34m of the switching power supply apparatus 2m also to the clock synchronization control unit 32s of the switching power supply apparatus 2s. In other words, the switching power supply apparatus 2m is used as a master switching power supply apparatus, using the switching power supply apparatus 2s as a slave switching power supply apparatus. When such arrangement is employed, the reference clock signal from the reference clock signal source 34m of the switching power supply apparatus 2m may be applied to the clock synchronization control unit 32s of the switching power supply apparatus 2s through a transmission circuit, e.g. an isolation transmission circuit, or more specifically, a photocoupler (PHC) 36m, which the switching power supply apparatus has, and a transmission circuit, e.g. a photocoupler 38s which the switching power supply apparatus 2s has. The use of the isolation photocouplers 36m and 38s is for the purpose of preventing erroneous operation of the control unit due to noise which would otherwise be superposed on the reference clock signal.

The photocouplers 36m and 38s have the same delay characteristic, but a delay in an amount of θ, for example, is given to the reference clock signal developed at the output of each of the photocouplers 36m and 38s. Accordingly, the reference clock signal of the switching power supply apparatus 2m supplied through the photocouplers 36m and 38s to the clock synchronization control unit 32s of the switching power supply apparatus 2s is given a delay of θ by the photocoupler 36m and a further delay of θ by the photocoupler 38s. On the other hand, if the reference clock signal from the reference clock signal source 34m were directly applied to the clock synchronization control unit 32m, it would be given no delay, and, therefore, the reference clock signal supplied to the clock synchronization control unit 32s would be delayed by an amount of 2θ relative to the reference clock signal supplied to the clock synchronization control unit 32m. If the switching device driving PWM pulse output sections 28m and 28s generated the respective PWM pulse signals, using the reference clock signals with such difference in delay therebetween, the PWM pulse signals would be out of phase with each other, resulting in occurrence of cross current and/or impracticableness of suppression of ripples, as discussed above.

To avoid such inconveniences, the reference clock signal outputted from the photocoupler 36m is returned to the master switching power supply apparatus 2m through another photocoupler 38m that the master switching power supply apparatus 2m has, and applied to the clock synchronization control unit 32m. The photocoupler 38m has the same delay characteristic as the photocouplers 36m and 38s, and, therefore, the reference clock signal appearing at the output of the photocoupler 38m has been given an amount of delay θ by the photocoupler 36m and a further amount of delay θ by the photocoupler 38m. Thus, both of the reference clock signals applied to the clock synchronization units 32m and 32s are delayed by the same amount of delay 2θ relative to the reference clock signal, and, therefore, they are in phase with each other. This enables the PWM pulse signals generated by the switching device driving PWM pulse output sections 28m and 28s to be in phase or to shift one relative to the other precisely by a desired amount.

For the parallel operation, an operating signal is applied from the digital signal processing unit 30m of the master switching power supply apparatus 2m to the digital signal processing unit 30s of the slave switching power supply apparatus 2s through a photocoupler 40m of the master switching power supply apparatus 2m and a photocoupler 40s of the slave switching power supply apparatus 2s. Similarly, an operating signal is applied from the digital signal processing unit 30s of the slave switching power supply apparatus 2s to the digital signal processing unit 30m of the master switching power supply apparatus 2m through a photocoupler 42s of the slave switching power supply apparatus 2s and a photocoupler 42m of the master switching power supply apparatus 2m. The digital signal processing units 30m and 30s perform also serial communications through photocouplers 44m and 44s they respectively have.

The described embodiment uses two switching power supply apparatuses 2m and 2s, but more switching power supply apparatuses may be used. Also, DC-to-DC converters or DC-to-AC converters may be used as the switching power supply apparatuses 2m and 2s, in place of the described AC-to-DC converters. The respective switching power supply apparatuses have been described as including the voltage step-down sections 8m and 8s, but known voltage-boosting units or voltage-boosting and step-down units using semiconductor switching devices may be used instead. Further, instead of IGBT's, other devices including MOS transistors and bipolar transistors may be used. The embodiment has been described as using the switching power supply apparatus 2m as the master switching power supply apparatus with the switching power supply apparatus 2s used as the slave switching power supply apparatus, but the switching power supply apparatus 2s may be used as the master switching power supply apparatus with the switching power supply apparatus 2m used as the slave switching power supply apparatus.

The invention claimed is:

1. A parallel-operating power supply system comprising a switching power supply apparatus and at least one other switching power supply apparatus, each of said switching power supply apparatuses having a switching device switching-controlled by a switching signal produced based on a clock signal and developing an output between two output terminals thereof, said output terminals of said switching power supply apparatuses being connected in parallel;

wherein, said switching power supply apparatus is a master switching power supply apparatus and said at least one other switching power supply apparatus is a slave switching power supply apparatus; a clock signal generated in said master switching power supply apparatus is applied to said at least one slave switching power supply apparatus as said clock signal therefor, said clock signal of said master power supply apparatus being applied to said at least one slave switching power apparatus through a first isolation transmission circuit of said master switching power supply apparatus and through a second isolation transmission circuit of said at least one slave switching power supply apparatus, said first and second isolation transmission circuits having a same delay characteristic; and said clock signal of said master switching power supply apparatus outputted through said first isolation transmission circuit is applied back to said master switching power supply apparatus through a third isolation transmission circuit of said master switching power supply apparatus, said third isolation transmission circuit having a delay characteristic same as the delay characteristic of said first and second isolation transmission circuits, for thereby producing said switching signal;

wherein, each of said first through third isolation transmission circuits is a photocoupler.

2. A parallel-operating power supply system according to claim 1, wherein said master and slave switching power supply apparatuses each have their own clock synchronization control unit for synchronizing the clock signal with a reference signal; said clock signal supplied to said slave switching power supply apparatus through said second isolation transmission circuit thereof is supplied to said clock synchronization control unit of that slave switching power supply apparatus; said master switching power supply apparatus has a reference clock signal source; a clock signal from said reference clock signal source is supplied to said second isolation transmission circuit of said slave switching power supply apparatus through said first isolation transmission circuit of said master switching power supply apparatus; and said clock signal outputted from said first isolation transmission circuit of said master switching power supply apparatus is supplied to said clock synchronization control unit of said master switching power supply apparatus through said third isolation transmission circuit.

3. A parallel-operating power supply system according to claim 2, wherein each of said switching power supply apparatuses has a reactor and a smoothing capacitor in the output thereof.

4. A parallel-operating power supply system according to claim 3, wherein each of said switching power supply apparatuses has a voltage a step-down section, a voltage boosting section or a voltage boosting and step-down section which includes said switching device.

5. A parallel-operating power supply system according to claim 2, wherein each of said switching power supply apparatuses has a voltage a step-down section, a voltage boosting section or a voltage boosting and step-down section which includes said switching device.

6. A parallel-operating power supply system according to claim 1, wherein each of said switching power supply apparatuses has a reactor and a smoothing capacitor in the output thereof.

7. A parallel-operating power supply system according to claim 6, wherein each of said switching power supply apparatuses has a voltage a step-down section, a voltage boosting section or a voltage boosting and step-down section which includes said switching device.

8. A parallel-operating power supply system according to claim 1, wherein each of said switching power supply apparatuses has a voltage a step-down section, a voltage boosting section or a voltage boosting and step-down section which includes said switching device.

\* \* \* \* \*

UNITED STATES PATENT AND TRADEMARK OFFICE
CERTIFICATE OF CORRECTION

PATENT NO. : 9,013,159 B2  Page 1 of 1
APPLICATION NO. : 14/017752
DATED : April 21, 2015
INVENTOR(S) : Hiroki Morimoto and Tatsuya Kawabata It is certified that error appears in the above-identified patent and that said Letters Patent is hereby corrected as shown below:

In the Claims,

Column 8, line 10 delete "a" before the words "step-down section"

Column 8, line 15 delete "a" before the words "step-down section"

Column 8, line 24 delete "a" before the words "step-down section"

Column 8, line 29 delete "a" before the words "step-down section"

Signed and Sealed this
Eleventh Day of August, 2015

Michelle K. Lee
*Director of the United States Patent and Trademark Office*